United States Patent
Lorcy et al.

(10) Patent No.: US 11,736,694 B2
(45) Date of Patent: *Aug. 22, 2023

(54) IMAGE DECODING METHOD, ENCODING METHOD, DEVICES, TERMINAL EQUIPMENT AND COMPUTER PROGRAMS THEREFOR

(71) Applicant: FONDATION B-COM, Cesson Sevigne (FR)

(72) Inventors: Victorien Lorcy, Rennes (FR); Pierrick Philippe, Melesse (FR)

(73) Assignee: FONDATION B-COM, Cesson Sevigne (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,299

(22) Filed: Oct. 5, 2021

(65) Prior Publication Data

US 2022/0030239 A1 Jan. 27, 2022

Related U.S. Application Data

(63) Continuation of application No. 16/638,644, filed as application No. PCT/EP2018/070123 on Jul. 25, 2018, now Pat. No. 11,159,794.

(30) Foreign Application Priority Data

Sep. 22, 2017 (FR) ...................... 1758789

(51) Int. Cl.
*H04N 19/12* (2014.01)
*H04N 19/119* (2014.01)
(Continued)

(52) U.S. Cl.
CPC ........... *H04N 19/12* (2014.11); *H04N 19/119* (2014.11); *H04N 19/176* (2014.11); *H04N 19/60* (2014.11)

(58) Field of Classification Search
CPC .... H04N 19/12; H04N 19/119; H04N 19/176; H04N 19/60; H04N 19/463; G06F 17/14
See application file for complete search history.

(56) References Cited

U.S. PATENT DOCUMENTS

| | | | |
|---|---|---|---|
| 11,159,794 B2* | 10/2021 | Lorcy | G06F 17/14 |
| 2016/0029046 A1* | 1/2016 | Li | G06T 9/007 375/240.2 |
| 2020/0177921 A1* | 6/2020 | Koo | H04N 19/159 |

OTHER PUBLICATIONS

Budagavi, Madhukar, et al. "Core transform design in the high efficiency video coding (HEVC) standard." IEEE Journal of Selected Topics in Signal Processing 7.6 (2013): 1029-1041 (Year: 2013).*

(Continued)

*Primary Examiner* — Tat C Chio
(74) *Attorney, Agent, or Firm* — David D. Brush; Westman, Champlin & Koehler, P.A.

(57) ABSTRACT

A method for decoding a digital image from encoded data representative of the image. The image is divided into blocks processed in a defined order. The method includes, for a current block having a predetermined number (Mv) of lines and number (Mh) of columns: decoding coefficients of the current block from coded data; decoding an index representative of an identifier of a transform among a plurality of transforms and identifying the transform, a transform being expressed as a vertical subtransform of size Mv*Mv and a horizontal subtransform of size Mh*Mh; transforming the current block into a decoded block transformed, from the transform obtained, by successive application of the vertical subtransform and then the horizontal subtransform or respectively of the horizontal subtransform and then the vertical subtransform; and reconstructing the image from the transformed decoded block. The transforming includes: a modified use of core sub-transform coefficients, their absolute values being retained.

15 Claims, 10 Drawing Sheets

(51) Int. Cl.
  *H04N 19/176* (2014.01)
  *H04N 19/60* (2014.01)

(56) References Cited

OTHER PUBLICATIONS

International Search Report dated Oct. 17, 2018 for corresponding International Application No. PCT/EP2018/070123, filed Jul. 25, 2018.
Written Opinion of the International Searching Authority dated Oct. 17, 2018 for corresponding International Application No. PCT/EP2018/070123, filed Jul. 25, 2018.
Guo Liwei et al., "Transform for Inter-Layer Prediction Resides in Scalable Video Coding", 2013 IEEE International Conference on Multimedia and Expo Workshops (ICMEW), IEEE, Jul. 15, 2013 (Jul. 15, 2013), pp. 1-6, XP032494435.
Leonid P. Yaroslavsky, "Fast Transforms in Image Processing: Compression Restoration, and Resampling", ADvances in Electrical Engineering, Jul. 6, 2014 (Jul. 6, 2017), pp. 1-23, XP055514659.
Sorensen H. V. et al., "Efficient Computation of the DFT with Only a Subset of Inoput or Output Points", IEEE Transactions on Signal Processing, IEEE Service Center, New York, NY, US, vol. 41, No. 3, Mar. 1, 1993 (Mar. 1, 1993), pp. 1184-1199, XP000364672.
Leonid P. Yaroslavsky, "Fast Discrete Sine-Interpolation: a Gold Standard for Image Resampling", In: "Advances in Signal Transforms: Theory and Applications", Jan. 1, 2007 (Jan. 1, 2004), Hindawi Publishing Corporation, New York, NY, USA, XP055514672.
Adria Arrufat, "Multiple Transforms for Video Coding", Dec. 11, 2015 (Dec. 11, 2015), XP055313399.
Madhukar Budagavi et al: "Core Transform Design in the High Efficiency Video Coding (HEVC) Standard", IEEE Journal of Selected Topics in Signal Processing, vol. 7, No. 6, Dec. 1, 2013 (Dec. 1, 2013), pp. 1029-1041, XP05520037.
Biatek (TDF) T et al: "Adaptive Transform Sets for Inter Coding", 4. JVET Meeting; Oct. 15, 2016-Oct. 21, 2016; Chengdu; (The Joint Video Exploration Team of ISO/IEC JTC1/SC29/WG11 and ITU-T SG. 16); URL: http://[henix.int-evry.fr/jvet/,, No. JVET-D0070, Oct. 5, 2016 (Oct. 5, 2016), XP030150303.
Marpe, Detlev, et al., "Context-Based Adaptive Binary Arithmetic Coding in the H.264/AVC Video Compression Standard", IEEE Transactions on Circuits and Systems for Video Technology, vol. X, No. Y, Month 2003, 18 pages.
Arrufat, Adrià, et al., "Rate-distortion optimised transform competition for intra coding in HEVC", IEEE VCIP, Dec. 2014, La Valette, Malta, pp. 73., hal-01112655, https://hal.archives-ouvertes.fr/hal-01112655, 5 pages.
Office Action dated Mar. 2, 2021 for corresponding U.S. Appl. No. 16/638,644, filed Feb. 12, 2020.
Notice of Allowance dated Jun. 28, 2021 for corresponding U.S. Appl. No. 16/638,644, filed Feb. 12, 2020.

\* cited by examiner

|   |   |   |   |   |   |   |   |
|---|---|---|---|---|---|---|---|
| 59 | 62 | 57 | 50 | 42 | 32 | 22 | 13 |
| 59 | 44 | 11 | -24 | -50 | -60 | -54 | -35 |
| 55 | 13 | -41 | -61 | -32 | 23 | 58 | 53 |
| 51 | -21 | -62 | -9 | 56 | 42 | -28 | -61 |
| 43 | -48 | -32 | 55 | 22 | -60 | -16 | 62 |
| 34 | -61 | 23 | 42 | -59 | 9 | 54 | -52 |
| 24 | -55 | 59 | -32 | -13 | 52 | -64 | 38 |
| 13 | -33 | 50 | -61 | 62 | -55 | 41 | -19 |

(rows labeled M' for top portion, M for full height; marker A on right)

|   |   |   |   |   |   |   |   |
|---|---|---|---|---|---|---|---|
| 35 | 54 | 60 | 50 | 24 | -11 | -44 | -59 |
| -53 | -58 | -23 | 32 | 61 | 41 | -13 | -55 |
| -61 | -28 | 42 | 56 | -9 | -62 | -21 | 51 |
| -62 | 16 | 60 | -22 | -55 | 32 | 48 | -43 |
| -52 | 54 | 9 | -59 | 42 | 23 | -61 | 34 |
| -38 | 64 | -52 | 13 | 32 | -59 | 55 | -24 |
| 19 | -41 | 55 | -62 | 61 | -50 | 33 | -13 |

|   |   |   |   |   |   |   |   |
|---|---|---|---|---|---|---|---|
| 59 | 62 | 57 | 50 | 42 | 32 | 22 | 13 |
| 59 | 44 | 11 | -24 | -50 | -60 | -54 | -35 |
| 55 | 13 | -41 | -61 | -32 | 23 | 58 | 53 |

(rows labeled M')

FIG. 9

| 59 | 57 | 42 | 22 |
|---|---|---|---|
| 55 | -41 | -32 | 58 |
| 0 | 0 | 0 | 0 |
| 0 | 0 | 0 | 0 |

FIG. 10 — K2, B

| 13 | 22 | 32 | 42 | 50 | 57 | 62 | 59 |
|---|---|---|---|---|---|---|---|
| -35 | -54 | -60 | -50 | -24 | 11 | 44 | 59 |
| 53 | 58 | 23 | -32 | -61 | -41 | 13 | 55 |

FIG. 11 — f1(K)

| 13 | 22 | 32 | 42 | 50 | 57 | 62 | 59 |
|---|---|---|---|---|---|---|---|
| 35 | 54 | 60 | 50 | 24 | -11 | -44 | -59 |
| 53 | 58 | 23 | -32 | -61 | -41 | 13 | 55 |

FIG. 12 — f2(K)

IMAGE DECODING METHOD, ENCODING METHOD, DEVICES, TERMINAL EQUIPMENT AND COMPUTER PROGRAMS THEREFOR

1. CROSS-REFERENCE TO RELATED APPLICATIONS

This application is a continuation of U.S. application Ser. No. 16/638,644, filed Feb. 12, 2020, which is a Section 371 National Stage Application of International Application No. PCT/EP2018/070123, filed Jul. 25, 2018, and published as WO 2019/057368 on Mar. 28, 2019, not in English, the contents of which are incorporated herein by reference in their entireties.

2. FIELD OF INVENTION

The field of the invention is that of signal compression, in particular of a digital image or a sequence of digital images, divided into blocks of pixels.

The invention relates more particularly to the transformation of a block of pixels, whether or not resulting from a prediction. In particular, it finds its application in a context of transform competition.

The encoding/decoding of digital images applies in particular to images from at least one video sequence comprising:
- images from the same camera and following each other in time (2D encoding/decoding),
- images from different cameras oriented according to different views (3D type encoding/decoding),
- corresponding texture and depth components (3D type encoding/decoding),
- etc.

This invention shall apply in a similar manner to the encoding/decoding of 2D or 3D type images.

In particular, but not exclusively, the invention may apply to the video encoding implemented in the current AVC (Advanced Video Coding) and HEVC (High Efficiency Video Coding) video coders and their future extensions (MVC, 3D-AVC, MV-HEVC, 3D-HEVC, post-HEVC, etc.), and to the corresponding decoding.

3. BACKGROUND

The compression of image and video sequences involves transformations. These are usually applied to a residual signal, the difference between the pixels in the image and the prediction made for a given block.

Transformations can be implemented in the form of coefficient matrices, or with the help of fast algorithms. In both cases, they need to store the transform coefficients.

The greater the transformations, the greater the number of coefficients.

The number of coefficients is also multiplied in the case where the encoder/decoder uses several transforms, in a context of transform competition, for example described in the publication of A. Arrufat et al. entitled "Rate-distortion optimized transform competition for intra coding in HEVC", published in the Proceedings of the IEEE Visual Communication on Image Processing Conference, December 2014, held in Valletta, Malta. pp. 73. The best transform for the current block is selected among several transforms available for encoding, according to a rate-distortion optimization criterion. For example, 5 transforms for 4×4 size blocks and 17 transforms for 8×8 size blocks are offered.

To reduce the quantity of coefficients to be stored, it is known to use trigonometric transforms, which have a limited number of coefficients. However, the choice is limited as there are only 16 DCT/DST type trigonometric transforms.

Furthermore, restricting oneself to these transforms limits the performance of the encoding because these transforms are not always adapted to the coded signals.

If non-trigonometric transforms are used, the quantity of coefficients to be stored is greater and increases linearly with the number of transforms.

For example, a transformation of size 8×8 requires the successive application of a horizontal subtransform and a vertical transform, which requires 2×64 coefficients=128. If 17 transforms are stored according to the Arrufat publication, 17*128=2176 coefficients are to be stored.

Transform competition improves compression performance, but at the cost of increased storage resource requirements.

4. SUMMARY

An exemplary embodiment of the present invention is directed to a method for decoding at least one digital image, from encoded data representative of said image, said image being divided into a plurality of blocks processed in a defined order, said method comprising the following steps, implemented for a block, called the current block, comprising a predetermined number (Mv) of lines and a predetermined number (Mh) of columns:
- decoding of current block coefficients from encoded data;
- decoding of an index representative of an identifier of a transform among a plurality of transforms and identification of the transform, a transform being expressed as a vertical subtransform of size Mv*Mv and a horizontal subtransform of size Mh*Mh;
- transformation of the current block into a decoded block transformed, from the transform obtained, by successive application of the vertical sub-transform and then of the horizontal subtransform or respectively of the horizontal subtransform and then of the vertical subtransform;
- reconstruction of the image from the transformed decoded block.

According to the invention, the transforming step comprises, for the application of at least one subtransform of the selected transform:
- reading from a memory the coefficients of at least one distinct sub-transform, called core transform, belonging to the plurality of transforms, said at least one core transform comprising a number of rows (Mh', M'v) of non-zero coefficients less than the number of rows and/or the number of columns of the current block, and
- the modified use of the coefficients read, their absolute values being retained, the coefficients read being applied to the Mh', respectively Mv', first rows of the block, the Mh-M'h subsequent rows respectively columns of the transformed block being constructionally zero.

Correlatively, the invention also relates to a method for encoding at least one digital image, said image being divided into a plurality of blocks of pixels processed in a defined order, said method comprising the following steps implemented for a current block, comprising a predetermined number (Mv) of rows and a predetermined number (Mh) of columns:

selecting a transform from a plurality of transforms, one transform being expressed as a vertical subtransform of size Mv*Mv and a horizontal sub-transform of size Mh*Mh;

transformation of the current block into a transformed block by the selected transform;

encoding the transformed block to produce coded data representative of the transformed block;

insertion of encoded data into a bitstream representative of the encoded image.

According to the invention, the transforming step comprises, for the application of at least one subtransform of the selected transform:

reading from a memory the coefficients of at least one distinct sub-transform, called core transform, belonging to the plurality of transforms, said at least one core transform comprising a number of rows (Mh', M'v) of non-zero coefficients less than the number of rows and/or the number of columns of the current block, and the modified use of the coefficients read, their absolute values being retained, the coefficients read being applied to the Mh', respectively Mv', first rows of the block, the Mh-M'h subsequent rows respectively columns of the transformed block being constructionally zero.

The principle of the invention consists in implementing at least two distinct subtransformations from the coefficients of a single core subtransform. The invention thus proposes to realize a system of transforms from separable subtransforms constructed from one or more core transforms. In this way, the number of transform coefficients to be stored in memory is reduced.

This principle applies to both the encoder and the decoder.

The embodiments that will now be presented apply to both the coding and decoding methods.

According to an aspect of the invention, said at least one core subtransform comprises a number of rows Mh', M'v of non-zero coefficients less than the number of rows Mh and/or the number of columns Mv of the current block and the coefficients read are used for the first Mh rows respectively the first Mv columns of the block.

This is equivalent to applying zero coefficients to the following (M-M') lines of the block.

The fact that the low frequency components carry the most information and are the most useful in video coding is exploited to reduce the number of stored coefficients.

According to another aspect of the invention, the modified use of the coefficients of the core subtransform includes a reversal of the lines of the core subtransform.

This subtransformed construction, with horizontal and vertical patterns, respectively, inverted with respect to the representation offered by the core, allows, without storing additional coefficients, to better represent some residual blocks.

For example, a line vector of the core subtransform comprising decreasing coefficients is transformed into an increasing line vector capable of considering an increasing gradient in the block to be encoded. Coding performance is therefore improved for this type of block.

According to another aspect of the invention, the modified use of the coefficients of the core subtransform comprises at least one permutation of two coefficients and at least one change of sign of a coefficient.

This subtransformed construction allows, without storing additional coefficients, to better represent residual blocks with horizontal or vertical patterns, respectively, with patterns that are spatially shifted with respect to the representation offered by the core.

For example, a core line vector comprising coefficients capable of representing a contour at a given position will allow the constructed subtransform, by position exchange, to precisely process contours at another position. Coding performance is therefore improved for this type of block.

The invention thus makes it possible to implement various transformations from the same core to better adapt to different types of blocks, without increasing the quantity of coefficients to be stored.

According to yet another aspect of the invention, since the number of rows of the current block is equal to the number of columns Mh=Mv, the plurality of transforms comprises:

a first vertical subtransform Av0=A of size Mv*Mv (=Mh*Mh) which uses identically the coefficients of a first core subtransform K;

a second vertical subtransform Av1=D which uses the coefficients of the first core subtransform K with reversal of its lines;

a first horizontal subtransform Ah0 of size Mh*Mh (=Mv*Mv) which uses identically the coefficients of the first core subtransform K;

a second horizontal subtransform Ah1=D which uses the coefficients of the first core subtransform with reversal of its lines.

Advantageously, a system including the 4 following transforms is provided:

$$T0 = Av0 \times Ah0 = A \times A$$

$$T1 = Av0 \times Ah1 = A \times D$$

$$T2 = Av1 \times Ah0 = D \times A$$

$$T3 = Av1 \times Ah1 = D \times D$$

This system only requires the storage of the subtransformed A, which represents $Mh^2$ coefficients, whereas the prior art needs $8*Mh^2$.

If, moreover, the core transform only contains Mh'<Mh lines of non-zero coefficients, only $M'^2$ coefficients need to be stored.

According to another embodiment of the invention, the plurality of transforms comprises:

a first vertical subtransform Av0=A of size Mv*Mv which uses identically the coefficients of a first core K subtransform of size Mv'×Mv with Mv' being less than Mv;

a second vertical subtransform Av1=C which uses the coefficients of the first core subtransform K with reversal of its lines;

a first horizontal subtransform Ah0=B of size Mh*Mh which uses identically the coefficients of a second core subtransform K' of size Mh'×Mh with Mh' being less than Mh;

a second horizontal subtransform Ah1=D which uses the coefficients of the second core subtransform K with reversal of its lines.

Advantageously, a system with the following 4 transforms is provided:

$$T0 = Av0 \times Ah0 = A \times B$$

$$T1 = Av0 \times Ah1 = A \times D$$

$$T2 = Av1 \times Ah0 = C \times B$$

$$T3 = Av1 \times Ah1 = C \times D$$

The use of two cores makes it possible to adapt in case the block is not square. It also allows to adapt to different statistical properties between rows and columns.

The invention also relates to a device adapted to implement the decoding method according to any of the particular embodiments defined above. This device may, of course, include the various characteristics relating to the method according to the invention. Thus, the features and benefits of this device are the same as those of the decoding method, and are not detailed further.

According to a particular embodiment of the invention, such a device is included in a terminal equipment.

The invention also relates to a device adapted to implement the coding method according to any of the particular embodiments defined above. This device may, of course, include the various characteristics relating to the method according to the invention. Thus, the features and benefits of this device are the same as those of the coding method, and are not further detailed.

According to a particular embodiment of the invention, such a device is included in a terminal equipment.

The invention also relates to a user terminal equipment comprising a device for decoding at least one image and/or a device for coding at least one image according to the invention.

The invention also relates to a computer program comprising instructions for implementing the steps of a method for encoding at least one image as described above, when this program is executed by a processor.

The invention also relates to a computer program comprising instructions for implementing the steps of a method for decoding at least one image as described above, when this program is executed by a processor.

These programs can use any programming language. They can be downloaded from a communication network and/or saved on a computer-readable medium.

Finally, the invention relates to recording media, readable by a processor, whether or not integrated into the device for encoding respectively decoding at least one image according to the invention, possibly removable, storing a computer program implementing an encoding respectively decoding method, as described above.

5. LIST OF FIGURES

Other advantages and characteristics of the invention will become clearer when reading the following description of a particular mode of making the invention, given as a simple illustrative and non-limitative example, and the appended drawings, among which:

FIG. 1 schematically illustrates a rectangular block x to be processed;

FIGS. 2A and 2B schematically illustrate the vertical and horizontal subtransform matrices applicable to block x;

FIG. 3 schematically illustrates the transformation of a line of block x by the horizontal subtransform Ah;

FIG. 4 schematically illustrates a horizontal subtransform A formed from a core subtransform K comprising a smaller number of lines;

FIG. 5 shows an example of horizontal subtransform A and an example of horizontal subtransform D deduced from subtransform A according to the invention;

FIG. 6 schematically illustrates the transformation of a line in block x by a horizontal subtransform formed from a core comprising a smaller number of lines;

FIG. 7 shows a numerical example of horizontal subtransform A;

FIG. 8 shows a numerical example of a horizontal subtransform D deduced from A by an operation of permutation of the coefficients except for the sign according to the invention;

FIG. 9 shows a numerical example of a K core with a number M' of lines being less than the number of lines in the current block;

FIG. 10 shows a numerical example of a core f(K) deduced from K by a subsampling operation from the core K according to the invention;

FIG. 11 shows a numerical example of a core deduced from K by a line reversal operator applied to each of the lines of core K;

FIG. 12 shows a numerical example of a core deduced from K by a line reversal operator with sign exchange performed on each of the lines of core K;

Figure 13:
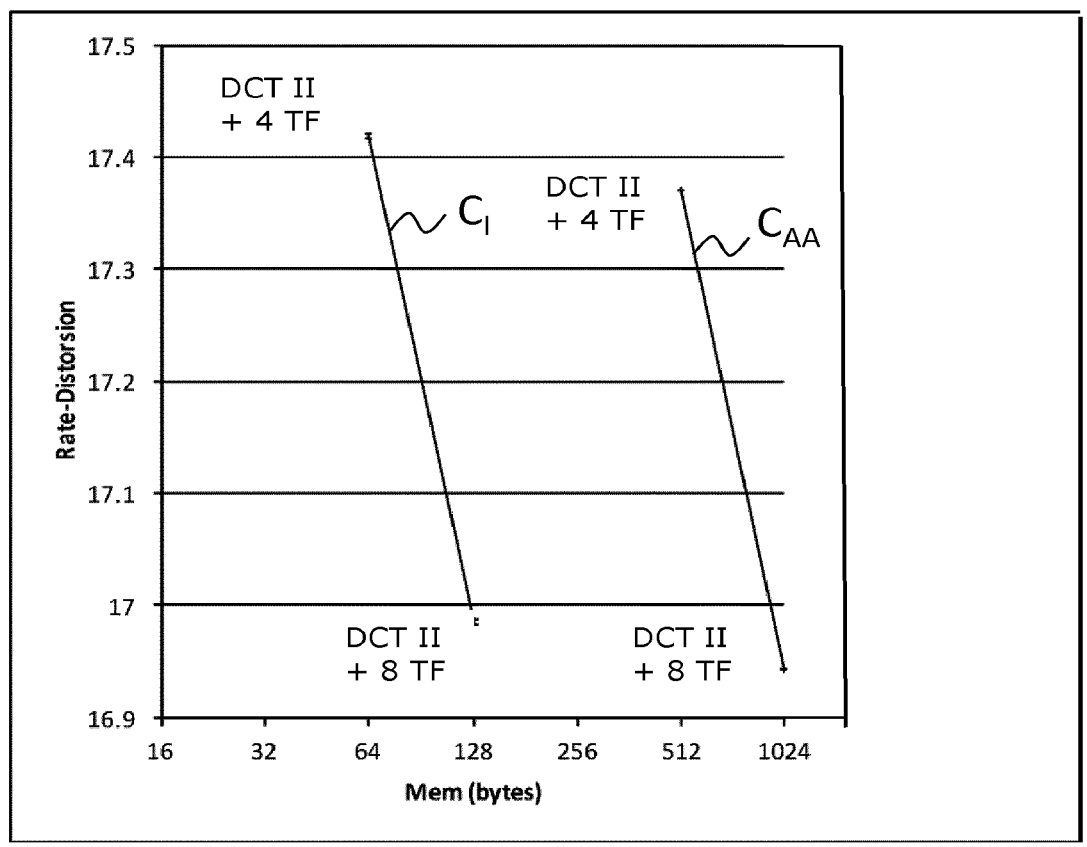
Figure 14:
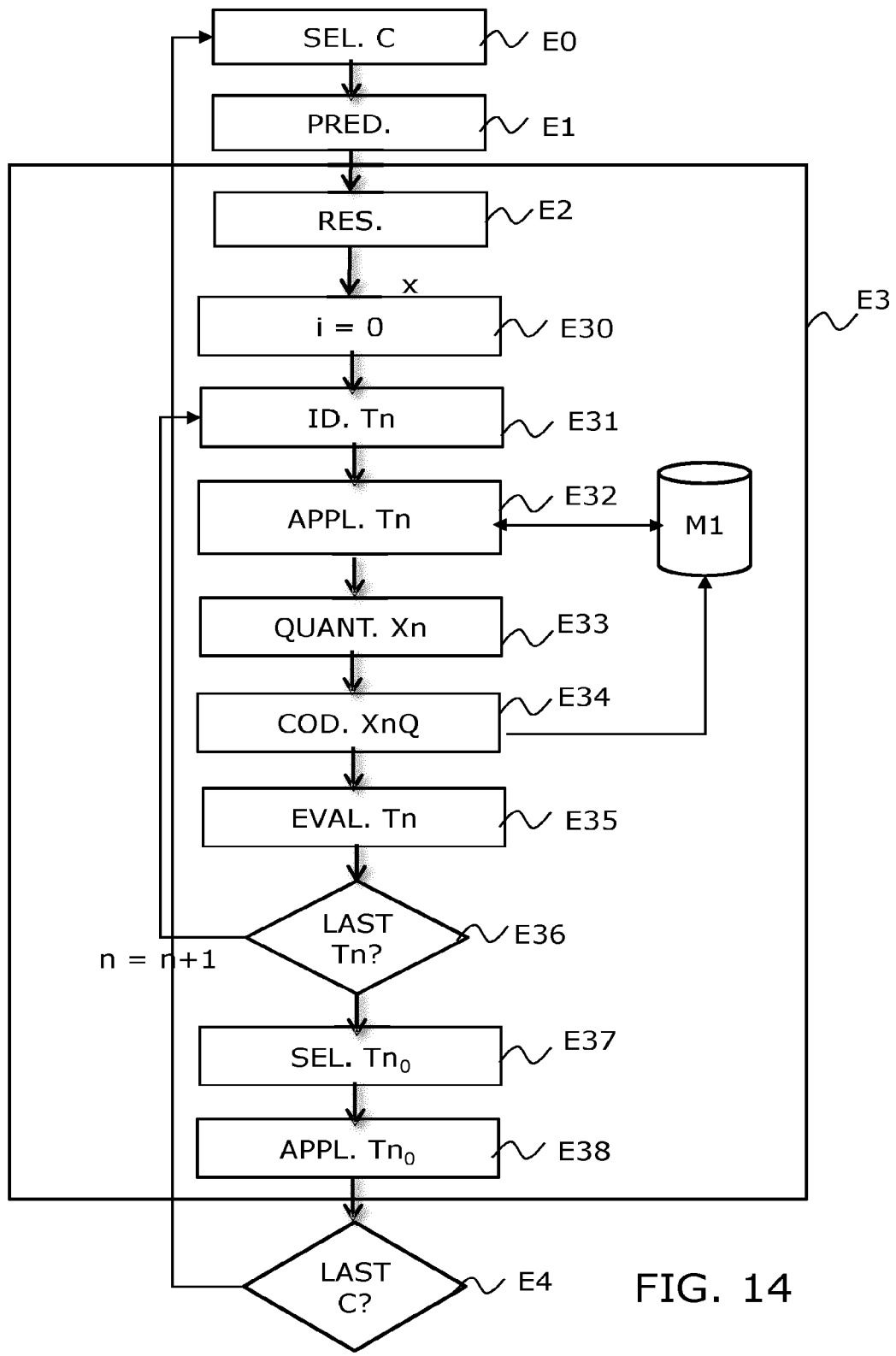
Figure 15:
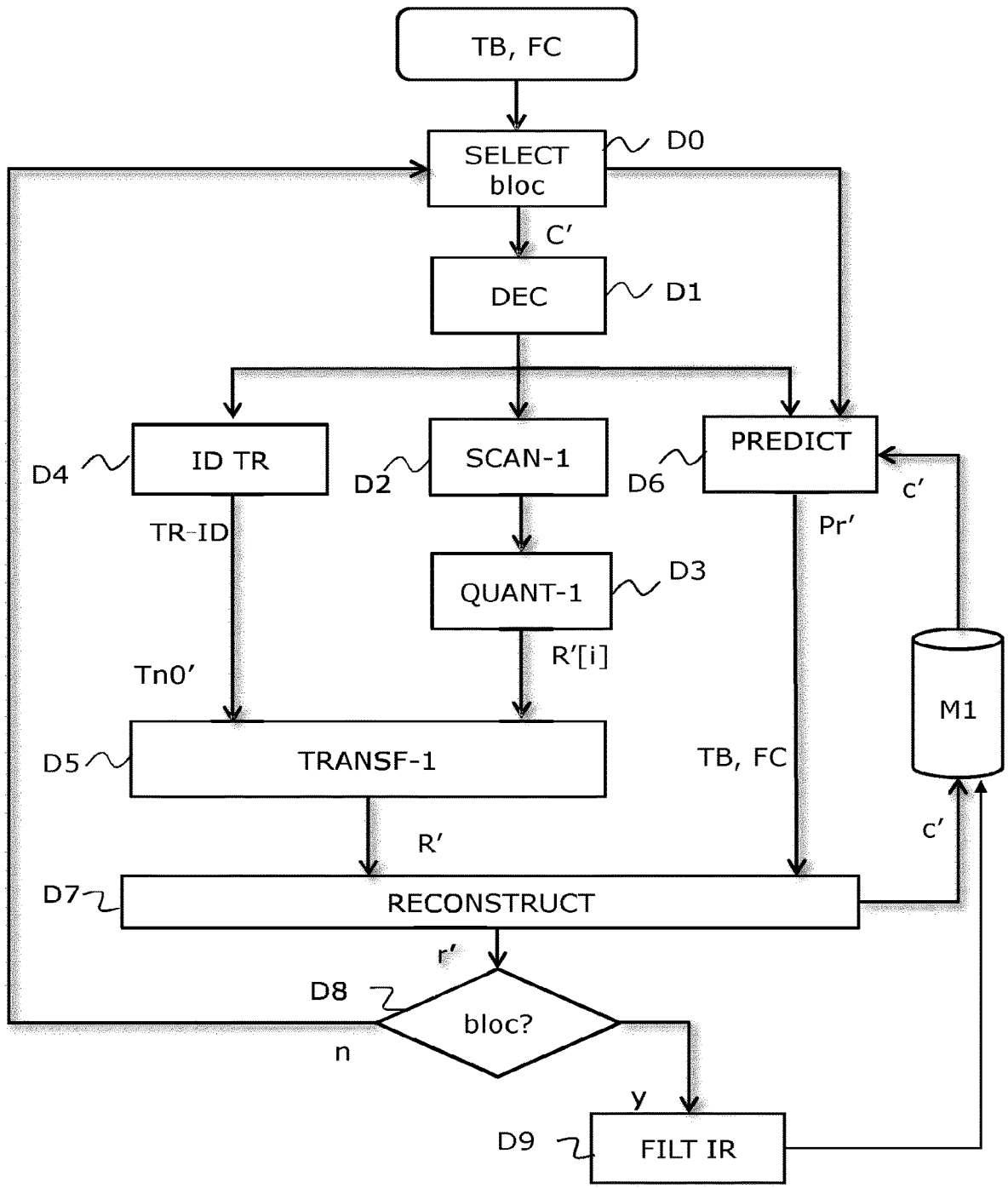
Figure 16:
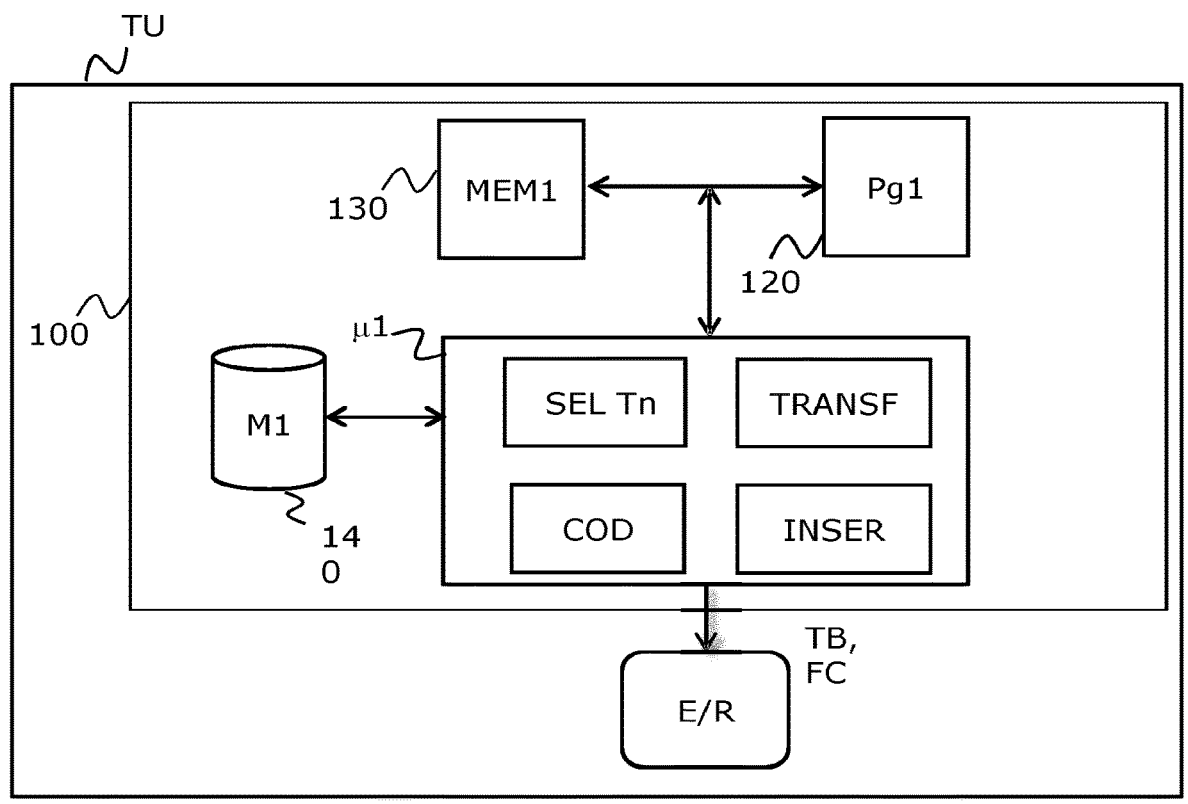
Figure 17:
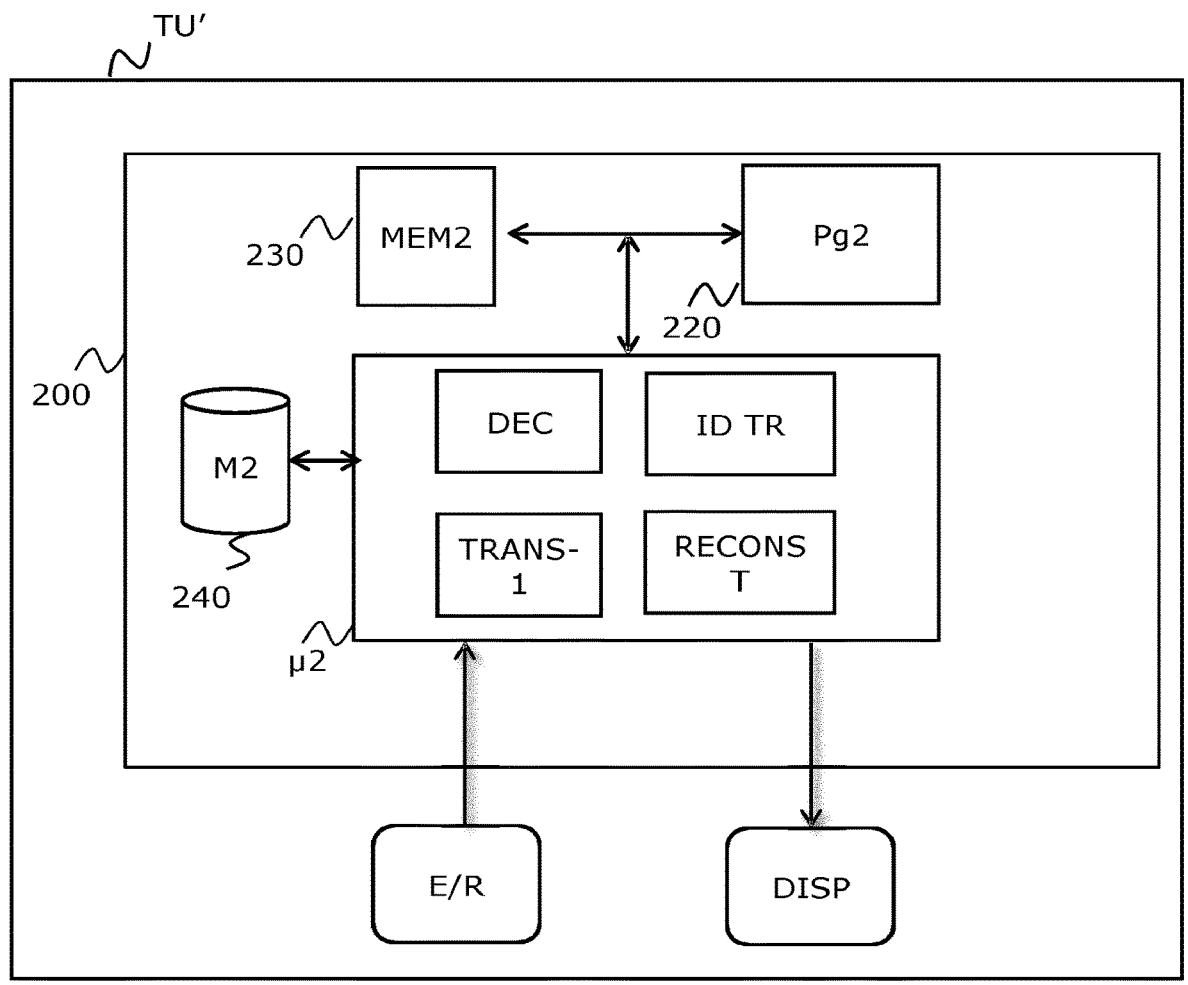

FIG. 13 compares the performance curves of a transform-competitive encoding device according to the invention and according to prior art;

FIG. 14 describes the steps of a method of encoding an image according to an embodiment of the invention;

FIG. 15 describes the steps of a method for decoding an image according to the invention;

FIG. 16 schematically illustrates an example of the hardware structure of a device for encoding the invention; and FIG. 17 schematically illustrates an example of the physical structure of a device for decoding the invention.

6. DESCRIPTION OF A PARTICULAR EMBODIMENT OF THE INVENTION

The general principle of the invention is based on the storage in memory of the coefficients of a core subtransform and on the use of the coefficients of this core to apply at least two distinct subtransforms to a block to be coded or decoded.

The invention applies both to the coding and to the decoding of a sequence of images in a context of transform competition.

In the rest of the description, we consider a plurality of T1 to TN transforms, put in competition.

It is considered that each transformation Tn is composed of two sub-transformations, vertical and horizontal, named $A_{v,n}$ and $A_{h,n}$ with n being an integer between 0 and N−1. Av,n acts on the columns and Ah,n on the rows of a block x to be transformed.

In the following description, block x is conventionally considered to be a residual block, resulting from the difference between the current block and its prediction, but the invention is not limited to this particular case and concerns any type of block.

The transformed block resulting from the transformation by Tn is called Xn.

Xn is expressed as follows:

$$Xn = A_{v,n} * (A_{h,n} * xt)^t \quad (1)$$

Where $()^t$ is the matrix transposition operator, * is the matrix multiplication sign.

For each transform Tn, the order of invocation of the subtransforms can be reversed, for example:

$$Xn = (A_{h,n} * (A_{v,n} * x)^t)^t \quad (2)$$

Figure 2A:
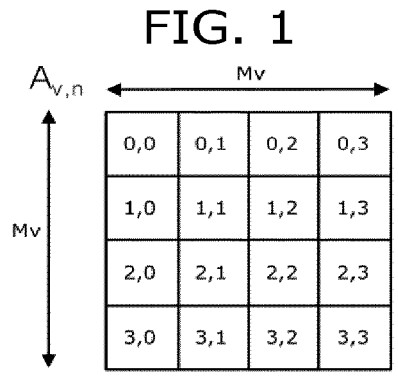

The vertical subtransform $A_{v,n}$ can be represented as a matrix of size $M_v$ rows and $M_v$ columns, as shown in FIG. 2A.

Figure 2B:
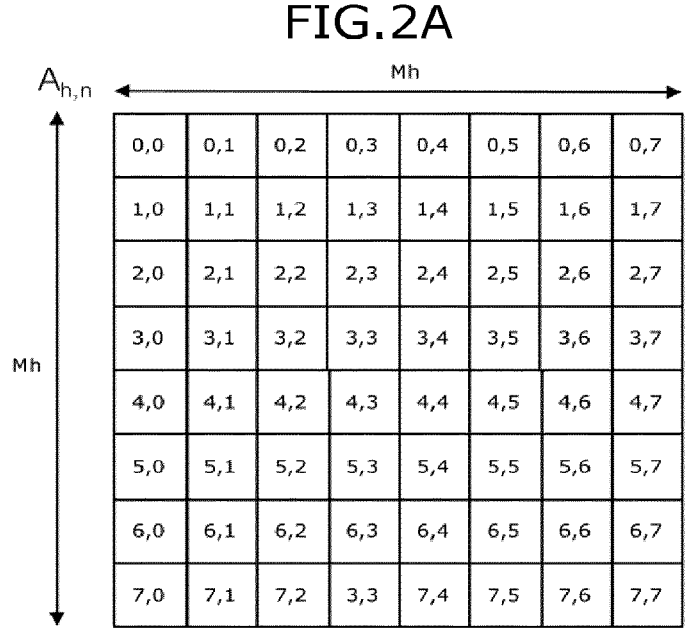

The horizontal subtransform $A_{h,n}$ can be represented as a matrix of size $M_h$ rows and $M_h$ columns, as shown in FIG. 2B.

For example, the result of applying the horizontal subtransform $A_{h,n}$ on a line I (composed of pixels $I_0, \ldots, I_{Mh}-1$) of size $M_v$ of the residual block x can be expressed as the following matrix product:

$$Lnt = (A_{h,n} * I^t) \qquad (3)$$

Figure 3:
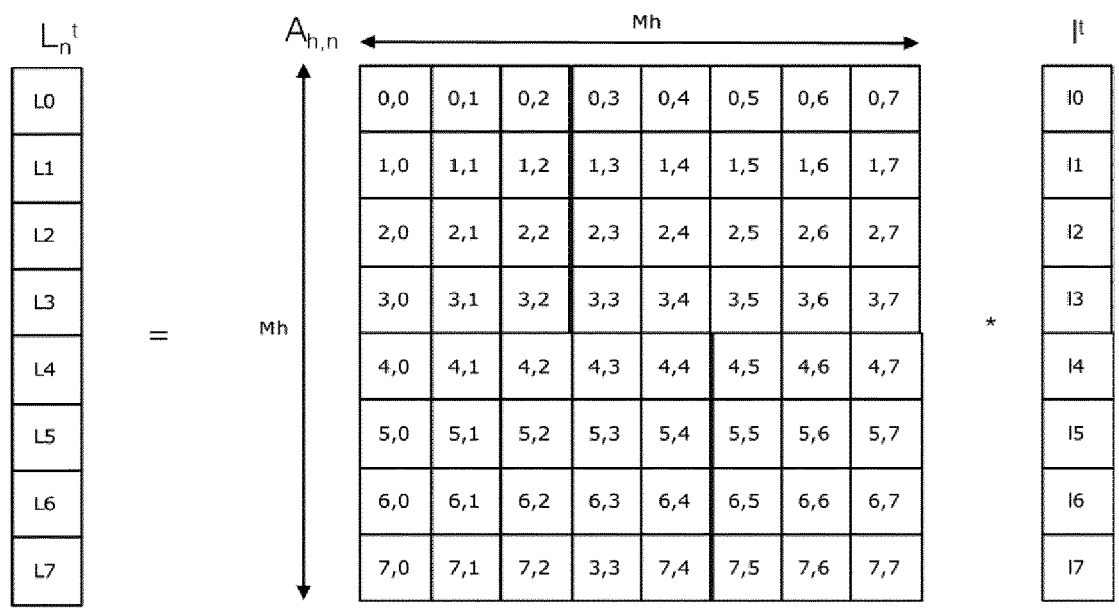

The result is a transformed line L, as shown in FIG. 3.

Each subtransform can also be implemented as a linear operator in an equivalent way, or each k-value ($k=0, \ldots M_{v-1}$) of the resulting vector Ln is calculated as follows:

$$L_{n,k} = a_{h,n,k,0} * I_0 + a_{h,n,k,1} * I_1 + a_{h,n,k,2} * I_2 + \ldots + a_{h,n,k,Mh-1} * I_{Mh-1} \qquad (4)$$

If the implementation is fixed-point implementation, shift and truncation operators are added to limit the output dynamics.

For example, the previous expression then takes the form:

$$L_{n,k} = (a_{h,n,k,0} * I_0 + a_{h,n,k,1} * I_1 + a_{h,n,k,2} * I_2 + \ldots + a_{h,n,k,Mh-1} * I_{Mh-1} + \text{offset}) >> Nbit \qquad (5)$$

In this case, the term offset represents an integer value, e.g. offset=$2^{Nbit-1}$, Nbit is related to the desired binary precision.

According to the invention, at least one subtransform K, called core, is considered, the coefficients of which are stored in memory, and the coefficients of this core are used to implement at least two distinct subtransforms, without the need to store additional coefficients in memory.

It follows that, according to the invention, in order to apply the Ah,n or Av,n subtransform, it is necessary to read the coefficients of the core subtransform into memory and to use them directly to calculate the result of the transformation of the block by the Ah,n or Av,n subtransform.

According to the invention, this use may comprise a modification of the position and/or sign of at least one coefficient of the core subtransform, without changing its absolute value.

It is understood that it is not necessary to go through a step of storing the coefficients of the subtransformed deduced from the core to apply it to the current block.

In case where the block x is rectangular with Mh different from Mv, a separate vertical core subtransform Kv and horizontal core subtransform Kh can be considered. Advantageously, Kh can be inferred from Kv or the other way around.

It is therefore possible to deduce several distinct subtransforms from the core subtransform, as long as this deduction does not require the reading of additional coefficients from memory, nor a transformation of the absolute value of the core coefficients by calculation.

For example, we simply deduce a first subtransform A of the core K by applying all the coefficients of K to the same elements of the block. A or part of A is identical to the core K, depending on the dimensions of K relative to the subtransform A.

According to the first option, K and A have the same dimensions. So we have A=K.

Figure 4:
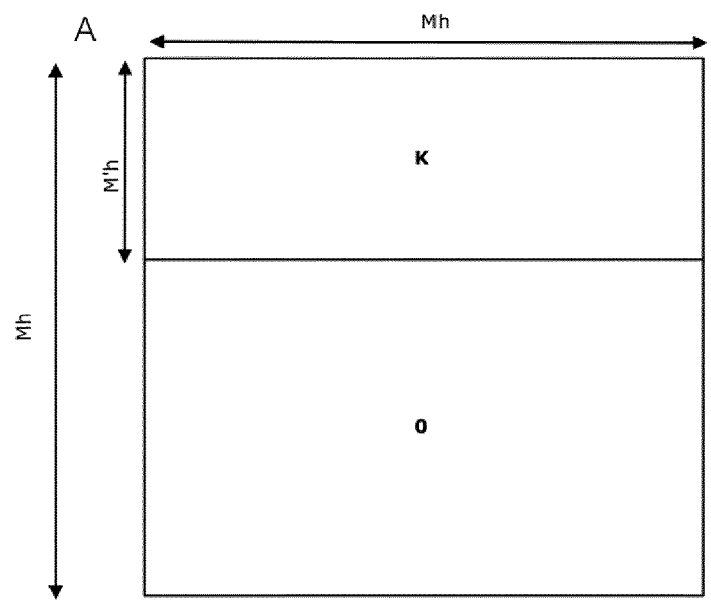

According to a second option, K comprises a number of lines M' smaller than the number of lines M of A. The transformation by A is then implemented by applying the coefficients of the first M' lines of K to the block. This amounts to constructing the subtransform illustrated in FIG. 4 for the horizontal subtransform Ah,n.

In addition, a second subtransform D of A is deduced by permutation or change of position of the coefficients of A. According to the invention, D is written in the form D=f(A), with f modification operator. D depends only on A and is written as a permutation of the values in the matrix A. Its coefficients are therefore used without modification, but at different elements of the block, i.e. positioned differently.

Figure 5:
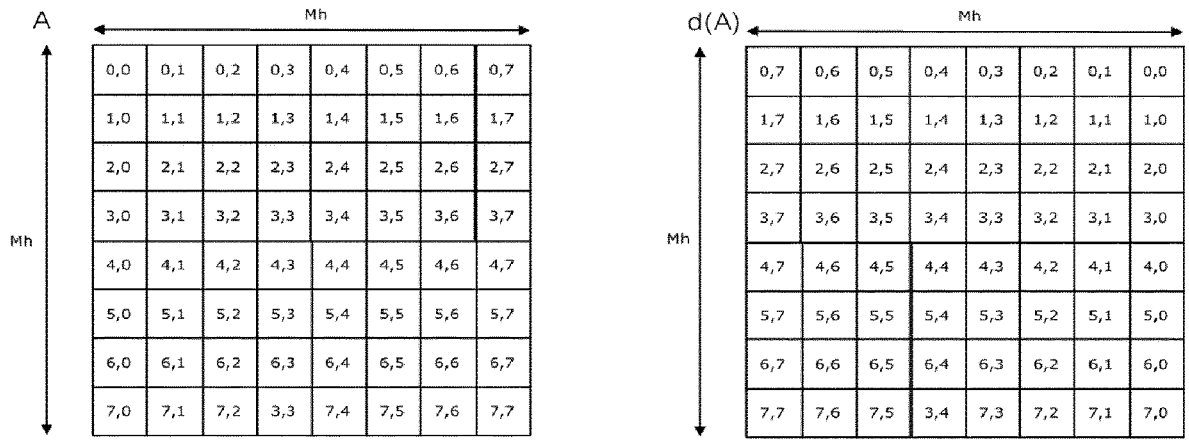

An operator f according to the invention may belong to the group comprising:

1. An inversion of the positions of the coefficients of each of the rows, as shown below the indices of the matrix d(A) are inverted on each of the rows with respect to the matrix A. In relation to FIG. 5, we see that the second index is reversed along the line;
2. A change of sign on the lines;
3. A combination of the first 2 points, called "permutation except for the sign".

The invention saves memory space by allowing several distinct subtransformations to be applied from a single core.

Indeed, let us consider the case of a transform T composed of a horizontal sub-transform of dimensions Mh*Mh and a vertical subtransform of dimensions Mv*Mv. Its use requires the storage of Mh*Mh+Mv*Mv coefficients.

For example, in the case of a competition with N=3 transforms and for blocks of size 8×4, an encoder or decoder according to the previous art needs to store 3*(64+16)=240 coefficients.

With the invention, a core K makes it possible to deduce at least one subtransform Ah and one subtransform Dh=f(Ah) from the same core K. Let's assume that this K core is of size Mh*Mh. This saves the storage of at least 64 coefficients.

We now consider the variant according to which the core is of size Mh'*Mh with Mh'<Mh.

The subtransform $A_h$ presents, in its matrix form, a set of lines (Mh−Mh'≥1) containing only zeros. In this case, Mh−M'$_h$ lines of $A_h$ are void and M'$_h$ lines are not void.

Figure 6:
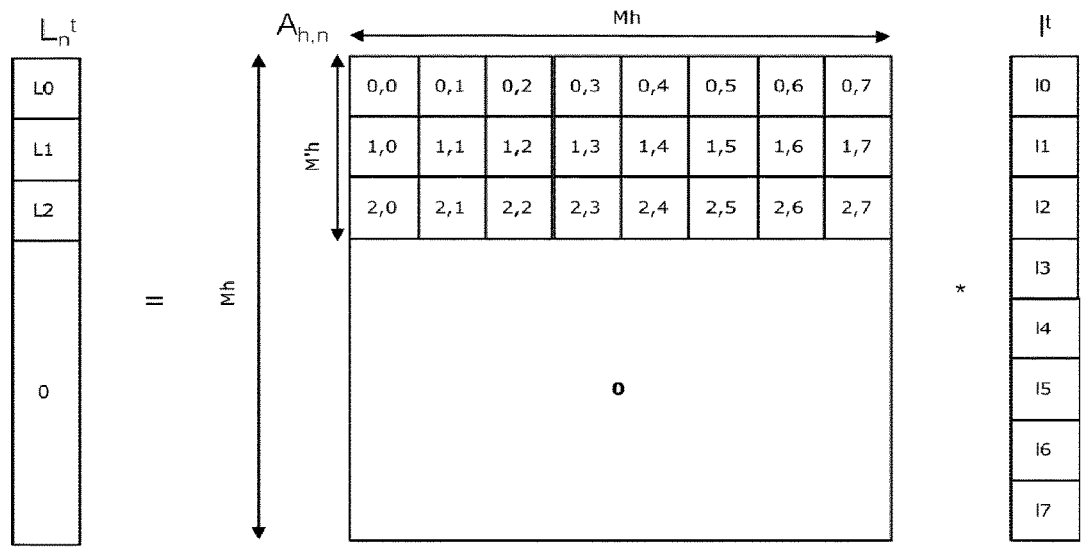

In this case, the transformed vectors will have components at zero, at positions where sub-transformed matrix lines are at zero, as shown in FIG. 6.

The K core of the transformation requires the storage of only Mh*M'h coefficients.

Moreover, only M'h coefficients of Ln will be calculated, the following Mh−M'h are zero. The application of the Ah subtransform is thus limited to the calculation of M'h frequency coefficients, the other Mh−M'h being zero by construction.

It saves on computing resources.

The inventor noticed that the use of a subtransform $A_h$ limited to a K core does not significantly impact the coding performance: this is due to the following phenomena:

The coefficients that carry the most information in video coding are the so-called low-frequency coefficients, i.e. corresponding to those from the first lines of the subtransforms.

The coefficients carry the details that are useless in low bit-rate coding because they are often suppressed during quantization, as they are negligible compared to the first coefficients resulting from the calculation of the subtransform from its first lines.

The competition of transforms, and the use of the transform $T_0$, which has no null lines, as a complement, allows to limit the eventual loss caused by the restriction of $A_h$ to a reduced core.

Several ways of implementing the invention are now described in detail.

1—First Embodiment of the Invention

In this example, a transform competition system is created from three transforms T0, T1, T2.

Rectangular blocks of dimensions Mh*Mv are processed with $M_h=8$ and $M_v=4$.

The transform $T_0$ is composed of a DCT type 2 horizontal subtransform and a DCT type 2 vertical subtransform (8×8 and 4×4 sizes respectively).

the transform $T_1$ is composed of a horizontal subtransform $A_{h,1}=A$ and a vertical subtransform $A_{v,1}=B_1$.

the transformation $T_2$ is composed of a subtransformation $A_{h,2}=D=f(A)$ and a second subtransformation $A_{v,2}=B_2$.

An example of core subtransform A is shown in relation to FIG. 7.

It is a preferably orthogonal matrix, i.e. it allows to reconstruct the pixels, with a small error, within a factor of one, if one performs the transformation of a block followed by the inverse transformation, which is then its transposal.

According to the invention, the subtransform D is written as D=f(A), where f is one of the operators described above.

In relation to FIG. 8, an example of subtransform D obtained from the coefficients of transform A using the "permutation except for the sign" operator is presented.

Thus D=f(A) is written in this realization, each of the lines of A has been permuted (permutation Dk,n=Ak,Mh−1−n for each line k=0, . . . , Mh−1 and column n=0, . . . , Mh−1) and the sign of the coefficients of some lines has been inverted:

In this example, only the 3 separate subtransforms A, B1 and B2 are stored in memory, in addition to the subtransforms of type DCT2. As previously described, the transform can be applied directly by reading the coefficients stored for A and applying them to the elements of the block to be processed, according to the operator f, without the need to store its own coefficients.

In terms of memory, as seen before, the previous art imposes in this configuration the storage of 3×(64+16)=240 coefficients for T0, T1 and T2.

With the invention, we have:
64+16 coefficients for the transform T0
64+16 coefficients for the transform T1
0+16 coefficients only because the subtransform $A_{h,2}$ uses the coefficients of $A_{h,1}$ without amplitude changes.

In total we have 176 coefficients to store.

According to a variant, the subtransform A is obtained from a core K of dimensions Mh'×Mh with Mh'<Mh, as shown in FIG. 9. The subtransform A can thus be expressed from the matrix K of the core of dimensions Mh×M'h and a null matrix 0 of size Mh×(Mh−M'h) which contains only zeros.

In the particular example of the first embodiment, we consider a core K with Mh'=3 lines. The Mh' lines of K correspond to the first Mh' lines of the matrix in FIG. 7. Therefore, $A_{h,1}=A$ only requires the storage of 3×8=24 coefficients.

According to this implementation variant, the storage of the coefficients requires:

T0 64+16 coefficients
T1 24+16 coefficients, it is based on Ah, which has zero lines.
T2 0+16 coefficients only because the subtransform $A_{h,2}$ uses the coefficients of $A_{h,1}$ without modifications.

In total we have 136 coefficients to store.

Thus, without significant loss of quality, the amount of storage required was reduced to the coefficients from 240 to 136.

This has a significant advantage even though the total number of coefficients to be stored might seem small. Indeed, in a hardware implementation of a processor-based encoder/decoder, the transforming step is very demanding, because all the encoded pixels are transformed at the decoder for example. The coefficients of the transforms must be quickly accessible, which requires the use of fast but expensive cache memories in terms of financial investment.

2—Second Embodiment of the Invention

In a second embodiment of the invention, rectangular residual blocks of 8×4 pixels are treated, but the number of transforms is increased to 5:

The transform $T_0$ consists of a type 2 CSD for the rows and columns (8×8 and 4×4 sizes respectively).

The transform $T_1$ is composed of a horizontal subtransform $A_{h,1}=A$ and a vertical subtransform $A_{v,1}=B$.

The transform $T_2$ is composed of a horizontal subtransform $A_{h,2}=f(A)$, with f a first operator, and a vertical subtransform $A_{v,2}=B$.

The transform $T_3$ is composed of a horizontal subtransform $A_{h,3}=A$ and a vertical subtransform $A_{v,3}=g(B)$, with g a second operator.

The transform $T_4$ is composed of a horizontal subtransform $A_{h,4}=f(A)$ and a vertical subtransform $A_{v,4}=g(B)$.

As in the first embodiment f( ) and g( ) are for example permutation except for the sign operators operating line by line.

In this case, the storage required to process a residual block is as follows:

64+16 coefficients for the transform T0;
64+16 coefficients for the transform T1;
0+0 coefficients for the transform T2, the two sub-transforms Av,2 and Ah,2 are deduced from Av,1 and Ah,1;
0+0 coefficients for the transform T3, the two sub-transforms Av,3 and Ah,3 being deduced from Av,1 and Ah,1;
0+0 coefficients for the transform T4, the two sub-transforms Av,4 and Ah,4 being deduced from Av,1 and Ah,1;

This represents a total of 160 coefficients to be stored, compared to 5*(64+16)=400 coefficients for exhaustive storage according to the prior art.

According to a variant, the subtransform Ah,1 is restricted to the core K1 used in the first embodiment, so that the number of coefficients to be stored becomes:

64+16 coefficients for the transform T0;
24+16 coefficients for the transform T1;
0 coefficients for the transforms T2 to T5

The total number of coefficients to be stored reaches 120, which is notoriously lower than the prior art.

Note that the subtransform B of dimensions Mv*Mv can also be in the form of a core K2 of smaller dimensions than B. In a particular embodiment, B is written in the form shown in FIG. 10. It consists of Mv' non-zero lines, with Mv'=2.

For example, the K2 core consists of the first two lines, which are taken from the K core of A. This sampling is carried out by sub-sampling K (every second column is taken starting from the first and every second row starting from the first row).

In this mode the number of coefficients to be stored becomes:

T0 64+16 coefficients
T1 24+0 coefficients, because the coefficients of B are contained in A.
and remains zero for T2 to T5 as in the previous case.

This amounts to a total of 104 coefficients to be stored, which is notoriously lower than the previous art.

3—Third Embodiment of the Invention

In this embodiment, the transforms are composed as follows:

The transform $T_0$ consists of a type 2 CSD for the rows and columns (8×8 and 4×4 sizes respectively);

The transform $T_1$ is composed of a subtransform $A_{h,1}=A$ and a second subtransform $A_{v,1}=B$.

The transform $T_2$ is composed of a subtransform $A_{h,2}=f_1(A)$ and a second subtransform $A_{v,2}=B$.

The transform $T_3$ is composed of a subtransform $A_{h,3}=f_2(A)$ and a second subtransform $A_{v,3}=B$.

A is constructed from the core K comprising for example Mh=8 columns and Mh'=3 rows as shown in FIG. 9 (already described).

f1( ) is a coefficient reversal operator performed on each of the lines of the core K. The result f1(K) obtained is shown in FIG. 11.

f2( ) is a return operator with sign exchange of some of the lines of the K core. In this example, it is done on the second line. The result f2(K) then takes the form shown in FIG. 12.

In this mode the number of coefficients to be stored becomes:

64+16 coefficients for the transform T0;
64+16 coefficients for the transform T1;
0+0 coefficients for the transform T2;
0+0 coefficients for the transform T3;
This makes a total of 160 coefficients.

4—Fourth Embodiment

In this embodiment, square blocks are considered, for example of dimensions 8 by 8 pixels. Of course, other sizes are possible.

We consider the following 5 transforms:

The transform $T_0$ consists of a type 2 DCT for the rows and columns (respective size 8).

The transform $T_1$ is composed of a horizontal subtransform $A_{h,1}=A$ and a vertical subtransform $A_{v,1}=A$. A is a subtransformed core of size 8×8.

The transformation $T_2$ is composed of a horizontal subtransform $A_{h,2}=f(A)$ and a vertical subtransform $A_{v,2}=A$.

The transformation $T_3$ is composed of a horizontal subtransform $A_{h,3}=A$ and a vertical subtransform $A_{v,3}=f(A)$.

The transformation $T_4$ is composed of a horizontal subtransform $A_{h,4}=f(A)$ and a vertical subtransform $A_{v,4}=f(A)$.

According to the first implementation mode f( ) is a permutation function operating line by line.

In this case, the necessary storage is as follows:
64 coefficients (DCT2) for the transform T0;
64 coefficients (A) for the transform T1;
0 coefficient for the transform T3, the two subtransforms Av,2 and Ah,2 being deduced from Av,1 and Ah,1;
0 coefficient for the transform T4, the two subtransforms Av,3 and Ah,3 being deduced from Av,1 and Ah,1;
0 coefficient for the transform T5, the two subtransforms Av,4 and Ah,4 being deduced from Av,1 and Ah,1.

This represents a total of 128 coefficients to be stored, compared to 5*(64+64)=640 coefficients for exhaustive storage according to the previous art.

In a variant of this method, too, the subtransform A is obtained from a smaller core K, e.g. the one used in the first method, which consists of 3 lines. The coefficients to be stored are therefore limited in this case to those of the 3 lines of the core, i.e. 24 coefficients. So in total only 64+24=88 coefficients are stored.

5—Other Alternatives for Implementing the Invention

Other embodiments are obtained by combining the subtransforms used in the previous modes to form new transforms. For example, a transform is formed from a horizontal respectively vertical DCT2 and a subtransform equal to A or deduced from A by a vertical respectively horizontal operator f.

A particular example is described here:

The transform $T_0$ consists of a type 2 DCT for the rows and columns (respective size 8).

The transform $T_1$ is composed of a horizontal subtransform $A_{h,1}=A$ and a subtransform $A_{v,1}=A$. A is a subtransformed core of size 8×8.

The transform $T_2$ is composed of a horizontal subtransform $A_{h,2}=f(A)$ and a vertical subtransform $A_{v,2}=A$.

The transform $T_3$ is composed of one subtransform $A_{h,3}=DCT2$ and a second subtransform $A_{v,3}=f(A)$.

The transform $T_4$ is composed of a horizontal subtransform $A_{h,4}=DCT2$ and a vertical subtransform $A_{v,4}=f(A)$.

A higher number of transforms can also be used. In the example below, there are 8 of them:

The transform $T_0$ is composed of a horizontal subtransform $A_{h,0}=A$ and a vertical subtransform $A_{v,0}=A$.

The transform $T_1$ is composed of a horizontal subtransform $A_{h,1}=A$ and a vertical subtransform $A_{v,1}=f(A)$ The transform $T_2$ is composed of a horizontal subtransform $A_{h,2}=B$ and a vertical subtransform $A_{v,2}=A$.

The transform $T_3$ is composed of a horizontal subtransform $A_{h,3}=B$ and a vertical subtransform $A_{v,3}=f(A)$.

The transform $T_4$ is composed of a horizontal subtransform $A_{h,4}=f(A)$ and a vertical subtransform $A_{v,4}=A$.

The transform $T_5$ is composed of a horizontal subtransform $A_{h,5}=f(A)$ and a vertical subtransform $A_{v,5}=f(A)$.

The transform $T_6$ is composed of a horizontal subtransform $A_{h,6}=f(B)$ and a vertical subtransform $A_{v,6}=A$.

The transform $T_7$ is composed of a horizontal subtransform $A_{h,7}=f(B)$ and a vertical subtransform $A_{v,7}=f(A)$.

The result is an 8-transform system that requires the storage of two subtransforms (A and B, with A≠B). The subtransform can be expressed, one or the other or both, in the form of a core as seen above.

In relation to FIG. 13, the impact of the invention on coding performance is illustrated under the conditions of the embodiments previously presented in Sections 4 and 5. It presents two curves of a measurement of a rate-distortion criterion as a function of the number of transformers in competition (equal to DCT II+4 or DCT II+8). The transforms considered are 8×8, and the storage required according to the previous art is 64 coefficients for each direction (horizontal and vertical) and each transform (5 competing transforms), thus 64*2*4=512 coefficients of one byte. According to the invention, a single stored transformation allows to generate 4 transformations (4th embodiment) that requires only 64 stored coefficients. We see that the feature with the invention notoriously uses less memory, while preserving the rate-distortion trade-off which is not significantly increased.

In relation to FIG. 14 a method for coding a digital image or image sequence (II) with I representing an integer index between 1 and L non-zero is now described, implementing the invention.

An image (It) is cut into rectangular blocks Mh*Mv or square blocks when Mh=Mv.

Rectangular blocks may have a different number of pixels than in the example just described, for example 2, 4, 8, 16, 32 etc, or even an odd number.

In E0, a C block to be processed is selected. In E1, a prediction P of the original block C is determined. This is a prediction block constructed by known means, typically by motion compensation (block from a previously decoded reference image) in the case of a so-called INTER prediction, or by INTRA prediction (block constructed from the decoded pixels immediately adjacent to the current block in the ID image). The prediction information related to P is encoded in the bitstream TB or compressed file FC. It is assumed here that there are J possible prediction modes MP1, MP2, . . . , MPJ, with J being a non-zero integer, and that the prediction mode chosen for block C is the embodiment MPJ.

Figure 1:
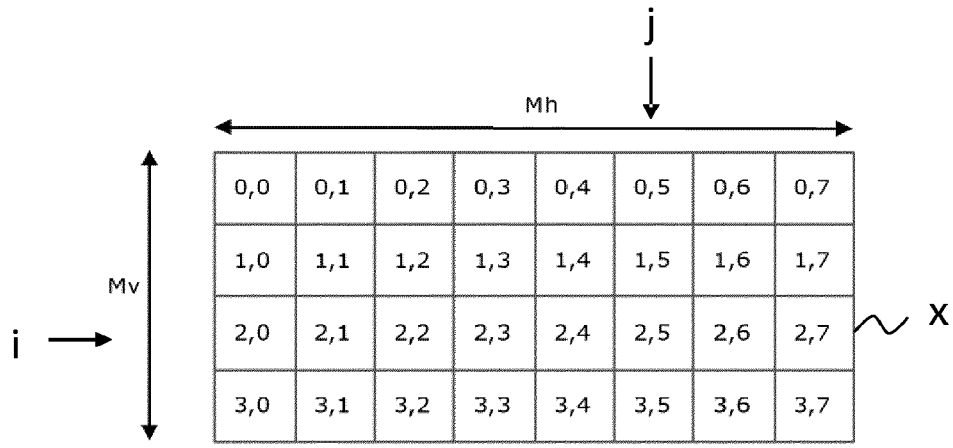

In a step E2, an original residue x is formed by subtracting x=C−P from the prediction P of the current block C to the current block C. An example of a residual block x of dimensions Mh×Mv of an image to be encoded is shown in FIG. 1.

In an E3 step, the residue x is transformed into a transformed block residue, called RT, by a transform. It is specified that steps E1 and E2 are optional and that step E3 can also be applied to the current block.

In a competitive system of transformations, we have:
A plurality of transforms $T_0$, $T_1$ and $T_2$, . . . , $T_{N-1}$, with N being an integer greater than or equal to 2. In the remainder of the description, it is assumed that this plurality of transforms is defined according to the invention, as previously described;
These transforms are adapted to process rectangular blocks in the broad sense (including square therefore) of a size defined by Mv by Mh pixels, with Mv, Mh non-zero integers, with $M_h$ columns and $M_v$ rows. For example, we have $M_h=8$ and $M_v=4$.

In E30, the transform index n is initialized to zero and the transform Tn=T0 is identified in E31. In E32, the transform Tn obtained is applied to the residual block x and the transformed block Xn is obtained. The coefficients of the transformed block are stored in memory.

Depending on the invention, two cases are possible:
The coefficients of the horizontal and vertical subtransforms that make up the Tn transform are stored in memory and are directly accessed by the encoder; or
The coefficients of at least one of the horizontal and vertical subtransforms that make up the transform Tn are not stored in memory, but are obtained from those of a core subtransform stored in memory. The application of the subtransform is performed by a predetermined operator f which reads the coefficients of the core transform, modifies them and applies them directly to the elements of the block as previously described.

The block Xn is then quantized to E33 in a conventional manner with a given quantization precision, called for example QP (for "Quantization Parameter") in the HEVC standard, and then the quantized values are scanned in a predetermined order to form a one-dimensional vector RQ[i], where the index i ranges from 0 to Mv×Mh−1. The index i is called the frequency of the RQ[i] coefficient.

Classically, these coefficients are scanned in ascending order of frequency, e.g. along a zigzag path, which is known from the JPEG still image coding standard. The resulting vector is then encoded in E34 in conventional form using a CABAC-type binary code as described in D. Marpe, H. Schwarz, T. Wiegand, "Context-based adaptive binary arithmetic coding in the H.264/AVC video compression standard" IEEE Transactions on Circuits and Systems for Video Technology (Volume: 13, Issue: 7), pages 620-636, July 2003, in the form of an encoded data stream STR.

In E35, the performance of the transform T0 on the residual block x is evaluated according to a flow-distortion criterion. A cost R of binary coding of the X0Q coefficients is evaluated. An inverse quantisation is applied to the quantized residue block X0Q, the inverse transform of T0 is applied to it. The performance of the transform is evaluated according to an RDO (Rate Distortion Optimisation) type measurement between the obtained block x' and the residual input block x, for example using a Lagrangian cost measurement J=D+λ×R, where D is the distortion measured on block x', R the bit rate generated during coding and λ the Lagrange multiplier, the value of which is predetermined, for example, according to the bit rate under consideration. This cost is stored in memory.

In E36, we check if there are still transformers to be tested. If n<N, then the next transform to be tested is selected, e.g. T1. Sub-steps E31 to E37 are repeated for each transform Tn of the plurality of competing transforms.

Once all the transforms have been evaluated, the one with the best performance is selected in E38. The chosen transformation is indicated to the decoder in the form of an identifier, e.g. an index carried by a binary code commonly carried by a CABAC code.

The selected transform is referred to as Tn0.

In E37, the encoded quantized coefficients corresponding to the transform Tn0 are obtained, for example by reading the memory where they were stored or by reapplying the Transform Tn0 to the residual block x and applying quantization to obtain $Res_{TQ}$.

At the end of step E4, a set of syntax elements is coded for the current block C, including the quantized transformed residue coefficients RQ[i], the signs of these coefficients, the prediction mode $MP_k$ etc.

Typically, entropy coding is used to exploit the distribution of syntax elements to reduce the throughput.

The bitstream STR obtained can be presented directly to a decoder or transmitted to a decoder via a telecommunications network as a stream or file.

Once received, it is processed by the decoder, which implements a method for decoding an image sequence according to the invention.

In connection with FIG. 15, the steps of a method for decoding an bitstream STR representative of a sequence of images $I_1$, $I_2$, . . . , $I_J$ to be decoded are now described, according to the invention.

For example, the bitstream STR was generated using the coding process shown in relation to FIG. 14. The bitstream STR is input to a DEC decoding device, which will be described in relation to FIG. 17.

The decoding of the stream is done frame by frame. For each image to be decoded, the decoding method performs decoding of the image block by block. We consider a current image $I_c$ to be decoded.

In step D0, a block to be processed from the current image Ic is selected, called the current block.

In D1, the data of the bitstream STR corresponding to the block $B_c$ are decoded by entropy decoding to provide syntax elements relating to the coding of the current block $B_c$. The decoded syntax elements comprise in particular prediction mode information identifying for the current block $B_c$, one prediction mode among a plurality of predetermined prediction modes, a group of quantized coefficients of a residue $Res'_{TQ}$ of a prediction of this current block $B_c$ and an identifier Tr-ID of a transform to be applied to the residue block.

In D2, the coefficients are run through in reverse order to the encoder and are de-quantized in D3, i.e. a scaling factor (inverse scaling) is applied, for example according to HEVC. The values obtained are arranged to form a block of Xc coefficients.

In D4, the transform Tn0' to be applied to the current residual block is identified from the decoded Tr-ID index.

In D5, we get the identified transform. Depending on the invention, two cases are possible:

- The coefficients of the horizontal sub-transform Ah, n0 and vertical sub-transform Av,n0 which make up the Tn0' transform are stored in memory and the decoder accesses them directly; or
- The coefficients of the sub-transforms which make up the transform Tn0' are obtained by applying an operator f to the coefficients of a transform A, B or a core K stored in memory, as previously described.

In D6, the identified transform is applied as a combination of subtransforms obtained as follows:

$$x_c = A^t_{v,n0} * (A^t_{h,n0} * Xc')^t$$

and you get the pixel residual block or spatial residual block xc.

In D7, the current block is predicted according to the prediction mode decoded in D1. The prediction can be based, in a so-called inter mode, on previously decoded and reconstructed reference images ($I_{R0}, I_{R1}, \ldots$), or, in a so-called intra mode, from already decoded blocks, for example in the same image. A predicted block P' is obtained.

In D8, the predicted block P' is added to the spatial residual block xc to obtain the local reconstructed block Rec which can be filtered to remove block effects. It is stored in a memory M1 to be used for prediction of the next blocks. The reconstructed block Rec' is added to the current image $IC_R$.

In a D9 step, it is checked whether all blocks of the image to be decoded have been decoded and reconstructed. In the negative case, a new current block is identified at D0 according to a predetermined path of the image to be decoded and the decoding method resumes at step D1 for this block.

In case all blocks of the image have been processed, the image $Ic_R$ is filtered at D10 and saved in a list of reference images $I_{1R}, I_{2R}, \ldots$ to be used later as a reference when decoding the following images of the image sequence.

The performance achieved by the invention is now presented. We place ourselves in the conditions of the fourth 4th embodiment.

As a reminder, according to this embodiment, 4 transforms T1, T2, T3 and T4 are formed from the same transform A and are put in competition with another transform T0 which is a DCT2 for the vertical and horizontal directions.

In order to compare the performance of the invention with an existing solution, the reference software of the HEVC standard has been modified to put into competition 5 transforms according to the prior art (in this example, the 4×4, 8×8, 16×16 and 32×32 transforms for square blocks) as presented in the Arrufat publication cited above.

The storage space required for each of the solutions is detailed in Table 1.

TABLE 1

| Mv = Mh | Storage of a matrix | Storage 2 Matrices (H + V) according to prior art | For N = 4 transformations N(H + V) according to prior art. | Storage required according to Invention |
|---|---|---|---|---|
| 4 | 16 | 32 | 128 | 16 |
| 8 | 64 | 128 | 512 | 64 |
| 16 | 256 | 512 | 2048 | 256 |
| 32 | 1024 | 2048 | 8192 | 1024 |
| TOTAL | | | 10880 bytes | 1360 bytes |

According to the invention only one matrix is stored for each block size. This requires 1360 bytes compared to 10880 bytes for the prior art.

In order to assess the performance in terms of compression, the difference in flow rate between the solution of the invention and that of the prior art is measured. To do this, 8 sequences are coded and the difference in throughput obtained for an identical quality is evaluated, for example according to the metric BDRate. These results are presented in Table 2 below:

TABLE 2

| Sequence | Difference in flow rate |
|---|---|
| ClassC-S01 | 0.09% |
| ClassC-S02 | −0.04% |
| ClassC-S03 | −0.10% |
| ClassC-S04 | −0.10% |
| ClassD-S01 | 0.04% |
| ClassD-S02 | −0.16% |
| ClassD-S03 | −0.18% |
| ClassD-S04 | 0.00% |
| Average | −0.06% |

We can see that there is a very small loss of flow: on average 0.06% more flow is required for the invention. This loss in throughput is negligible in view of the storage savings made (1360 bytes compared to 10880).

It is understandable that with the invention a significant storage gain is achieved for the transform coefficients, without significantly altering the coding performance.

It should be noted that the invention just described can be implemented by means of software and/or hardware components. In this respect, the terms "module" and "entity" used in this document may correspond to either a software component, a hardware component or a set of hardware and/or software components, capable of implementing the function(s) described for the module or entity concerned.

In connection with FIG. 16, an example of a simplified structure of a device for coding a digital image according to the invention is now presented. Device 100 implements the coding method according to the invention just described in relation to FIG. 14.

For example, device 100 comprises a processing unit 110, equipped with a µ1 processor, and driven by a computer program $Pg_1$ 120, stored in a memory 130 and implementing the method according to the invention.

At initialization, the code instructions of the computer program $Pg_1$ 120 are, for example, loaded into a memory RAM before being executed by the processor of the processing unit 110. The processor of processing unit 110 implements the steps of the method described above according to the instructions of computer program 120.

In a first embodiment of the invention, device 200 comprises a computing machine dedicated or configured to:
- decode current block coefficients from coded data;
- decode an index representative of an identifier of a transform among a plurality of transforms, a transform being expressed as a vertical subtransform of size Mv×Mv and a horizontal subtransform of size Mh×Mh;
- obtain the identified transform in the plurality of transforms;
- transform the coefficients of the current block into a decoded block transform, from the transform obtained, by successive application of the vertical subtransform and then the horizontal subtransform or respectively the horizontal subtransform and then the vertical subtransform; and
- reconstruct the image from the transformed decoded block.

In a second example of embodiment of the invention, device 200 comprises the following units:
- decoding current block coefficients from coded data;
- decoding information representative of an identifier of a transform among a plurality of transforms and identification of the transform, a transform being expressed as a vertical subtransform of size Mv×Mv and a horizontal sub-transform of size Mh×Mh;
- transforming the coefficients of the current block into a decoded block transform from the identified transform by successive application of the vertical subtransform and then the horizontal subtransform or respectively the horizontal subtransform and then the vertical subtransform;
- reconstructing the image from the transformed decoded block.

In the two embodiments, the transformation according to the invention comprises, for at least one transform of the plurality of transforms and for the application of at least one subtransform of the identified transform:
- reading from a memory the coefficients of at least one distinct sub-transform, called core transform, belonging to the plurality of transforms, and
- the modified use of the coefficients read, their absolute values being retained.

Device 200 further comprises a memory or unit M2 for storing the coefficients of said at least one core transform.

The device 200 can be advantageously integrated into a user terminal TU. It is then arranged to cooperate with at least the following modules of the terminal TU:
- a data transmitting/receiving module E/R, via which the bitstream TB or compressed file FC is received from a telecommunications network, e.g. a wired or wireless network;
- a display module DISP for decoded images.

Thanks to its good performance, and in particular to the storage saving providing, the invention just described in its various embodiments applies to any block video compression scheme. In particular, the encoding and decoding methods described above can be integrated into standard video encoders/decoders such as H.266, HEVC/H.265, AVC/H.264 or a future post-HEVC standard, or into any type of proprietary video encoders/decoders. The encoding and decoding methods according to the invention also apply to all types of still picture coders/decoders.

An exemplary embodiment of the present invention improves the situation described with respect to the prior art.

An exemplary embodiment compensates for the disadvantages of prior art.

Specifically, an exemplary embodiment provides a solution that allows the use of a large number of separate transforms, while reducing the amount of storage resources required.

It goes without saying that the embodiments described above have been given for information purposes only and are in no way restrictive, and that many modifications can easily be made by a person having ordinary skills in the art without departing from the scope of the invention.

In a second example of implementation of the invention, device 100 comprises at least one unit for obtaining a plurality of transforms, a transform expressed as a vertical subtransform and a horizontal subtransform, a unit for selecting a transform from the plurality of transforms, a unit for transforming the current block into a transformed block by means of the selected transform, a unit for encoding the transformed block to produce encoded data representative of the transformed block, and a unit for inserting the encoded data into a bitstream representative of the encoded image.

In the two embodiments, the transformation according to the invention comprises, for at least one transform of the plurality of transforms and for the application of at least one subtransform of the selected transform:
- reading from a memory the coefficients of at least one distinct sub-transform, called core transform, belonging to the plurality of transforms, and
- the modified use of the coefficients read, their absolute values being retained.

These units are controlled by Processor μ1 of Processing Unit 110.

Such a 100 device can advantageously be integrated into a user terminal TU. The 100 device is then arranged to cooperate at least with the next module of the terminal TU:
- a data transmitting/receiving module E/R, via which the bitstream TB or compressed file FC is transmitted in a telecommunications network, e.g. a wired or wireless network.

In connection with FIG. 17, an example of a simplified structure of a device for decoding an image sequence according to the invention is now presented. Device 200 implements the decoding method according to the invention which has just been described in its various embodiments.

For example, device 200 comprises a processing unit 210, equipped with a μ2 processor, and driven by a computer program Pg$_2$ 220, stored in a memory 230 and implementing the method according to the invention.

During initialisation, the code instructions of the computer program Pg$_1$ 220 are, for example, loaded into RAM memory before being executed by the processor of the processing unit 210. The processor of the processing unit 210 implements the steps of the method described above according to the instructions of computer program 220.

In a first embodiment of the invention, device 200 comprises a computing machine dedicated or configured to:
- obtain a plurality of transforms, one transform being expressed as a vertical subtransform and a horizontal subtransform;
- select a transform from the plurality of transforms;
- transform the current block into a transformed block, using the selected transform;
- encode the transformed block to produce coded data representative of the transformed block;
- Insert the encoded data into a bitstream representative of the encoded image;

What is claimed is:

1. A method for decoding an image divided into a plurality of blocks, said method comprising the following acts, implemented by a decoding device for a current block of the image, said current block comprising Mv rows and Mh columns:

decoding data corresponding to the current block, including decoding an index representative of an identifier identifying a transform among a plurality of transforms, each transform of the plurality being expressed as a vertical subtransform of size Mv*Mv and a horizontal subtransform of size Mh*Mh, and applying the identified transform to decoded data corresponding to the current block, by application of the vertical subtransform and then of the horizontal subtransform;

wherein applying the identified transform comprises, for the application of at least one subtransform;

getting coefficients of the at least one subtransform from a core transform, belonging to the plurality of transforms, said core transform comprising a number M'v of rows of non-zero coefficients less than the number Mv of rows of the current block.

2. The method according to claim 1, wherein applying the identified transform comprises getting the coefficients of the at least one subtransform from a core transform among two core transforms consisting of a first core transform and a second core transform, at least part of the coefficients of the second core transform being based on the coefficients of the first transform.

3. The method according to claim 1, wherein the number M'v of rows of the core transform is smaller than the number of rows of the at least one substransform.

4. The method according to claim 1, wherein the at least one subtransform includes a set of rows containing only zeros.

5. The method according to claim 1, wherein Mv=Mh.

6. The method according to claim 1, wherein Mh=32.

7. The method according to claim 6, wherein Mv=Mh.

8. A device for decoding a stream of coded data representing at least one image divided into a plurality of blocks, where the device comprises:

a computing machine configured or dedicated to:

for a current block of the image, comprising a predetermined number Mv of rows and a predetermined number Mh of columns:

decoding data corresponding to the current block, including decoding an index representative of an identifier identifying a transform among a plurality of transforms, each transform of the plurality being expressed as a vertical subtransform of size Mv*Mv and a horizontal subtransform of size Mh*Mh, and applying the identified transform to decoded data corresponding to the current block, by application of the vertical subtransform and then of the horizontal subtransform;

wherein applying the identified transform comprises, for the application of at least one subtransform;

getting coefficients of the at least one subtransform from a core transform, belonging to the plurality of transforms, said core transform comprising a number M'v of rows of non-zero coefficients less than the number Mv of rows of the current block.

9. The device according to claim 8, wherein applying the identified transform comprises getting the coefficients of the at least one subtransform from a core transform among two core transforms consisting of a first core transform and a second core transform, at least part of the coefficients of the second core transform being based on the coefficients of the first transform.

10. The device according to claim 8, wherein the number M'v of rows of the core transform is smaller than the number of rows of the at least one substransform.

11. The device according to claim 8, wherein the at least one subtransform includes a set of rows containing only zeros.

12. The device according to claim 8, wherein Mv=Mh.

13. The device according to claim 8, wherein Mh=32.

14. The device according to claim 13, wherein Mv=Mh.

15. The device according to claim 8, wherein the device is implemented in a user terminal equipment.

* * * * *